United States Patent [19]

Itoh et al.

[11] Patent Number: 4,755,554

[45] Date of Patent: Jul. 5, 1988

[54] SILICONE RUBBER COMPOSITION

[75] Inventors: Kunio Itoh; Toshio Shinohara; Masaharu Takahashi; Takeo Yoshida, all of Gunma, Japan

[73] Assignee: Shin-Etsu Chemical Co., Ltd., Tokyo, Japan

[21] Appl. No.: 32,648

[22] Filed: Mar. 31, 1987

[30] Foreign Application Priority Data

Apr. 1, 1986 [JP] Japan .................................. 61-75138
May 8, 1986 [JP] Japan ................................. 61-105572

[51] Int. Cl.$^4$ ............................................. C08L 83/00
[52] U.S. Cl. ................................... 524/588; 524/493; 524/789; 524/860; 528/24; 528/32
[58] Field of Search ................... 528/24, 32; 524/493, 524/588, 789, 860

[56] References Cited

U.S. PATENT DOCUMENTS

| 3,231,542 | 1/1966 | Eisinger et al. | 528/24 |
| 3,779,987 | 12/1973 | Razzano | 528/24 |
| 4,525,528 | 6/1985 | Bush | 528/24 |

Primary Examiner—Melvyn I. Marquis
Attorney, Agent, or Firm—Millen & White

[57] ABSTRACT

A silicone rubber composition suitable for hot-air vulcanization under normal pressure without the disadvantages of surface tackiness and internal voids in the cured rubber products and also free from the problems of corrosiveness to metals and toxicity to workers, which comprises, as the curing agent for the organopolysiloxane, a peroxide derivative of dibenzoyl peroxide which is substituted on each of the benzene nuclei with substituted silyl, e.g. trimethyl silyl, group or a silyl-substituted methyl, e.g. trimethylsilyl methyl, group.

19 Claims, No Drawings

SILICONE RUBBER COMPOSITION

BACKGROUND OF THE INVENTION

The present invention relates to a silicone rubber composition and, more particularly, to a silicone rubber composition curable by the hot-air vulcanization under normal pressure into a cured silicone rubber body having excellent heat stability without the problems of formation of internal voids and surface tackiness as well as problems relating to safety and workers' health.

As is well known, silicone rubbers have excellent properties, especially heat and cold resistance and electric properties, so that they are widely used in a variety of applications. The processing of silicone rubbers into cured bodies is variously modified depending on the type of the silicone rubber composition and the desired application of the cured rubber article. For example, curing of silicone rubber compositions is performed by several different methods depending on the type of the composition and the properties required for the cured silicone rubber products. The most widely practiced method of curing is to admix the silicone rubber composition with an organic peroxide followed by heating of the peroxide-admixed composition. Known organic peroxides suitable as a curing agent for silicone rubber compositions include dibenzoyl peroxide, 2,4-dichlorodibenzoyl peroxide, dicumyl peroxide, di-tert-butyl peroxide, 2,5-dimethyl-2,5-di(tert-butylperoxy) hexane, tert-butyl perbenzoate, tert-butyl cumyl peroxide and the like. It is generally understood that 2,4-dichlorodibenzoyl peroxide is the only one among them suitable for use as a curing agent for a silicone rubber composition which is processed into tubes, insulation of electric wires, sheets and the like by hot-air vulcanization under normal pressure with continuous extrusion.

2,4-Dichlorodibenzoyl peroxide as a curing agent of silicone rubber composition has several problems. For example, because it is a halogen-containing compound it is corrosive to the surface of metallic bodies and the decomposition products thereof may be toxic or, at least, undesirable respect to workers' health. Furthermore, the cured silicone rubber obtained by using this particular peroxide as the curing agent is not totally satisfactory with respect to the heat stability under a hermetically sealed condition and with respect to permanent compression set.

The process of hot-air vulcanization under normal pressure per se involves several problems. When the silicone rubber compound extruded out of an extruder machine is introduced into a vulcanization oven kept at 300° to 500° C., for example, the volatile materials contained in the silicone rubber compound, such as low-molecular organopolysiloxanes, are vaporized and expanded to form microscopically tiny internal voids, which cause up to 30% decrease in breakdown voltage of the cured silicone rubber in compared to the cured rubber body obtained by curing under compression of the same silicone rubber composition. This deficiency in hot-air vulcanized silicone rubber articles cannot be improved by secondary curing. Although secondary curing is effective to improve the properties of the silicone rubber as cured and to decrease surface tackiness, the silicone rubber composition as extruded still must be dusted on the surface when the continuous-length extruded body is to be wound up, so that several problems are unavoidable not only in the pollution of the working environment but in the subsequent processing by the dusting powder.

U.S. Pat. No. 4,061,704 states that the above mentioned problems and disadvantages in the hot-air vulcanization of silicone rubber using 2,4-dichlorodibenzoyl peroxide can be overcome by using a tert-alkylperoxy alkyl carbonate such as tert-butylperoxy octadecyl carbonate, tert-amylperoxy-2,6,8-trimethyl-4-nonyl carbonate, tert-amylperoxy octadecyl carbonate and the like and the curing agent. A problem in the use of such peroxide compounds as the curing agent of a silicone rubber composition is that the decomposition products thereof are compounds having a relatively large molecular weight so that the decomposition products included in the cured silicone rubber and not removed from the cured rubber, thereby greatly affecting the heat resistance inherent in the silicone rubber.

An alternative method of hot-air vulcanization of silicone rubber compositions under normal pressure is to utilize the socalled hydrosilation reaction without using any organic peroxides. For example, a silicone rubber composition comprising an organopolysiloxane having aliphatically unsaturated hydrocarbon groups, e.g. vinyl, an organohydrogenpolysiloxane and a catalytic amount of a platinum compound is heated under normal pressure so that by addition reaction crosslinks form between the silicon-bonded vinyl groups and the silicon-bonded hydrogen atoms to cure the composition. Such an organopolysiloxane composition has a disadvantageously short pot-life and sometimes is subject to scorching so that the field of application thereof is limited.

SUMMARY OF THE INVENTION

Thus, the present invention has an object to provide a novel silicone rubber composition suitable for hot-air vulcanization under normal pressure and which is free from the above described problems and disadvantages in the prior art compositions. The novel composition is prepared by admixing the organopolysiloxane as the base ingredient of the composition with an organic peroxide as defined hereinafter.

The silicone rubber composition of the present invention comprises:

(A) 100 parts by weight of an organopolysiloxane of the average unit formula

$$R^1{}_a R^2{}_b SiO_{(4-a-b)/2}, \quad (I)$$

in which $R^1$ is a monovalent hydrocarbon group free from aliphatic unsaturation, $R^2$ is an alkenyl group, the subscript a is a positive number in the range from 1.8 to 2.2 or, preferably, from 1.95 to 2.05 and the subscript b is zero or a positive number not exceeding 0.1 with the proviso that a+b is in the range from 1.8 to 2.2 or, preferably from 1.95 to 2.05; and (B) from 0.1 to 5 parts by weight of an organic peroxide of the general formula

$$X_m \cdot R_n C_6 H_{5-m-n} \cdot CO.O.O.\text{-}COC_6H_{5-m-n} \cdot X_m \cdot R_n, \quad (II)$$

in which R is a monovalent group selected from the class consisting of methyl, ethyl, methoxy and ethoxy groups, X is a silyl group of the formula $-SiR^3{}_3$ or a silyl-substituted methyl group of the formula $-CH_2SiR^3{}_3$, $R^3$ being a hydrogen atom, a methyl group or an alkoxy group, the subscript m is 1 or 2 and the subscript n is zero, 1, or 2.

In particular, it is preferable that the subscript b in the average unit formula (I) is not zero so that the organopolysiloxane should have a substantial amount of the alkenyl, e.g. vinyl, groups bonded to the silicon atoms. More preferably, such alkenyl, e.g. vinyl, groups should be bonded to the silicon atoms at the molecular chain terminals of the organopolysiloxane molecules in such a manner that each of the terminal silicon atoms has two or three vinyl groups bonded thereto. Further, it is preferable that at least one of the substituent groups denoted by X in the general formula (II) is the silyl group of the formula —$SiR^3_3$, which is, more preferably, at the 2- or, in particular, 4-position of the benzene nucleus relative to the carbonyl, and each of the benzene nuclei is substituted with one or two R groups, which is methyl or ethyl group, at the 2- and/or 5-positions of the nucleus relative to the carbonyl.

DETAILED DESCRIPTION OF THE PREFERRED EMBODIMENTS

As is understood from the above given summary of the invention, the most characteristic feature of the inventive composition is the presence therein of the very specific organic peroxide represented by the general formula (II) as the curing agent. As distinguished from conventional silicone rubber compositions curable by the process of hot-air vulcanization, the inventive silicone rubber composition after hot-air vulcanization is free from surface tackiness and internal voids and has excellent properties as a rubber. The cured rubber composition is highly heat-resistant under a hermetically sealed condition and better permanent compression set. The thermal decomposition products of the organic peroxide in the inventive composition have a relatively small molecular weight and are easily dissipated so that the prior art problems due to residual decomposition products of the curing agent are avoided in the inventive composition.

The base ingredient in the inventive silicone rubber composition is the component (A) which is an organopolysiloxane represented by the average unit formula (I) given above. In the formula, the symbol $R^1$ denotes a monovalent hydrocarbon group free from aliphatic unsaturation as exemplified by alkyl groups, e.g. methyl, ethyl, propyl and butyl groups, cycloalkyl groups, e.g. cyclohexyl group, and aryl groups, e.g. phenyl and tolyl groups, as well as those substituted groups obtained by replacing a part or all of the hydrogen atoms in the above named hydrocarbon groups with substituent atoms and/or groups such as halogen atoms, cyano groups and the like including chloromethyl, 3,3,3-trifluoropropyl and 2-cyanoethyl groups. Two kinds or more of the monovalent hydrocarbon groups in conformity with the definition of $R^1$ can be contained in a molecule of the organopolysiloxane. The $R^1$ groups preferably are methyl and/or phenyl groups. More preferably, at least 50% by moles of the monovalent hydrocarbon groups bonded to the silicon atoms should be methyl groups.

The group denoted by the symbol $R^2$ is an alkenyl group, e.g. vinyl, allyl and cyclopentadienyl groups, of which vinyl is preferred. Although the alkenyl groups denoted by $R^2$ are optional in the organopolysiloxane, it is preferable that the organopolysiloxane contains a substantial number of the alkenyl groups in a molecule. The vinyl groups are introduced into the molecule of the organopolysiloxane in the form of a difunctional methyl vinyl siloxane unit of the unit formula ViMeSiO or a trifunctional siloxane unit including vinyl dimethyl siloxane unit of the unit formula $ViMe_2SiO_{0.5}$, vinyl methyl phenyl siloxane unit of the unit formula $ViMePhSiO_{0.5}$, divinyl methyl siloxane unit of the unit formula $Vi_2MeSiO_{0.5}$ and trivinyl siloxane unit of the unit formula $Vi_3SiO_{0.5}$ at the molecular chain terminals, in which the symbols Me, Vi and Ph denote methyl, vinyl and phenyl groups, respectively. In particular, the organopolysiloxane molecules should preferably be terminated at the end of each molecular chain with a divinyl methyl siloxane unit or trivinyl siloxane unit, although other monofunctional siloxane units such as trimethyl siloxane units, methyl diphenyl siloxane units and the like can be the terminal groups.

Typically, the organopolysiloxane molecules are mainly composed of dimethyl siloxane units of the unit formula $Me_2SiO$, optionally in combination with 20 mol% or less of other difunctional siloxane units such as methyl phenyl siloxane units, methyl ethyl siloxane units, diphenyl siloxane units and the like as well as methyl vinyl siloxane units, in an amount of 1 mol% or smaller in the overall siloxane units. The organopolysiloxane or diorganopolysiloxane viz., component (A), should preferably have an average degree of polymerization of at least 500 or a viscosity of at least 3000 centistrokes at 25° C. in order to ensure that the cured silicone rubber of the inventive composition will have excellent mechanical properties.

Though not essential, it is preferable that the inventive composition contains a substantial amount of a reinforcing filler in order to improve the mechanical strengths of the cured silicone rubber of the inventive composition. Suitable reinforcing fillers include finely divided silica fillers having a particle diameter of 1 to 20 nm and a specific surface area of at least 50 m²/g, preferably, from 100 to 400 m²/g as determined by the BET method. Typically, the silica filler is a fumed silica filler manufactured by the dry process. The amount of such a reinforcing filler in the inventive silicone rubber composition should be in the range from 5 to 100 parts by weight or, preferably, from 20 to 80 parts by weight per 100 parts by weight of the organopolysiloxane. The inventive silicone rubber composition is optionally admixed, in addition to the above mentioned reinforcing fillers, with various kinds of non-reinforcing or semi-reinforcing fillers such as quartz powder, diatomaceous earth, light calcium carbonate powder, alumina, zinc oxide, iron oxide and graphite powder as well as various fibrous materials according to need. The compounding of these fillers can be facilitated by admixing the composition with a so-called softener, e.g., diphenyl silane diol or a low-molecular organopolysiloxane terminated at each molecular chain end with a silicon-bonded alkoxy or hydroxy group. It is preferable that the compounding of the filler with the organopolysiloxane is followed by a heat treatment of the blend prior to the addition of the peroxide curing agent as the component (B) described below.

The other essential ingredient in the inventive silicone rubber composition is a specific peroxide compound, i.e., component (B) represented by the general formula (II) given above. The compound is a derivative of dibenzoyl peroxide having the substituent groups denoted by the symbol X and, optionally, R on each of the benzene nuclei. R is selected from the group consisting of methyl, ethyl, methoxy and ethoxy groups and the group denoted by X is a silyl group of the formula —SiR$^3{}_3$ or a silylsubstituted methyl group of the formula —CH$_2$SiR$^3{}_3$, in which R$^3$ is a hydrogen atom or a monovalent group selected from the group consisting of methyl, ethyl and alkoxy, e.g. methoxy and ethoxy, groups. The group denoted by R$^3$ is preferably a methyl group. The subscript m is 1 or 2 and n is zero, 1, or 2. Preferably, each of the benzene nuclei of the compound of the general formula (II) has one silyl group of the formula —SiR$^3{}_3$ or, in particular, trimethyl silyl group —SiMe$_3$ bonded thereto at the 2- or 4-position relative to the carbonyl.

Dibenzoyl peroxide derivatives of the general formula (II) which are suitable as the component (B) in the inventive silicone rubber composition include: bis(-trimethylsilyl-substituted benzoyl) peroxides; e.g. bis(2-trimethylsilyl benzoyl) peroxide and bis(4-trimethylsilyl benzoyl) peroxide; bis(trimethylsilylmethyl-substituted benzoyl) peroxides; bis[di-trimethylsilyl)-substituted benzoyl]peroxides, e.g. bis[2,4-di(trimethylsilyl) benzoyl] peroxide; bis(2-methyl-4-trimethylsilyl benzoyl) peroxide; bis(2,6-dimethyl-4-trimethylsilyl benzoyl) peroxide; bis(2-methyl-4-dimethylvinylsilyl benzoyl) peroxide; bis(2-methyl-4-trimethylsilyl benzoyl) peroxide; bis(2-ethyl-4-dimethylvinylsilyl benzoyl) peroxide; bis(2,6-diethyl-4-trimethylsilyl benzoyl) peroxide; bis(2-methoxy-4-trimethylsilyl benzoyl) peroxide; and the like.

These silyl-substituted dibenzoyl peroxide derivatives, which belong to a novel class of compounds not known in the prior art nor described in any publications, can be synthesized, for example, by the reaction of 2 moles of a silyl-substituted benzoyl chloride of the formula (R$^3{}_3$Si)$_m$R$_n$·C$_6$H$_{5-m-n}$·COCl with 1 mole of hydrogen peroxide in the presence of an acid acceptor such as sodium hydroxide, potassium hydroxide, pyridine and the like.

The amount of the curing agent, viz., component (B), in the inventive silicone rubber composition should be in the range from 0.1 to 5 parts by weight or, preferably, from 0.3 to 3 parts by weight per 100 parts by weight of the organopolysiloxane, viz., component (A).

In addition to the above described essential components (A) and (B) as well as other optional ingredients such as fillers, the inventive silicone rubber composition may be admixed with an organosilicon compound having at least one hydrogen atom directly bonded to the silicon atom, which is referred to as the Si—H compound hereinbelow, when further decrease in the surface tackiness of the cured silicone rubber of the inventive composition after hot-air vulcanization is desired. The Si—H compound is preferably be an organohydrogen polysiloxane of which the molecular structure is not particularly limitative including straight chain linear, cyclic and branched chain compounds ones. Examples of such Si—H compounds are: linear methyl hydrogen polysiloxane terminated at each molecular chain end with a trialkyl, e.g. trimethyl, silyl group; 1,3,5,7-tetramethyl cyclotetrasiloxane; copolymeric polysiloxane composed of monofunctional dimethyl hydrogen siloxane units of the formula Me$_2$HSiO$_{0.5}$ and tetrafunctional siloxane units of the formula SiO$_2$ and copolymeric linear polysiloxane composed of methyl hydrogen siloxane units and dialkyl, e.g. dimethyl, siloxane units as well as polysilalkylene siloxanes, polysilanes, polycarbosilanes and the like having one or more silicon-bonded hydrogen atoms.

The amount of the Si—H compound added to the inventive silicone rubber composition should be at least 0.05 part per 100 parts by weight of the organopolysiloxane as the component (A) when substantial improvement in the surface tackiness of the cured rubber is desired. Preferably, the amount thereof should be in the range from 0.05 to 10 parts by weight or, more preferably, from 0.1 to 5 parts by weight per 100 parts by weight of the component (A). When the amount thereof is too large, adverse effects on the electric properties and heat resistance of the cured silicone rubber of the inventive composition result.

The silicone rubber composition of the invention can be prepared by uniformly blending the above described essential and optional ingredients in a suitable blending or rubber-processing machine. When the composition is compounded with a filler, Si—H compound and other optional ingredients, the order of blending of the components is not particularly limitative. It is, however, convenient and effective if the organopolysiloxane component (A) is first uniformly compounded with the filler and that mixture is then admixed with the peroxide curing agent component (B) and, if desired, the Si—H compound.

Optionally, the inventive silicone rubber composition is further admixed with various kinds of known additives conventionally used in silicone rubber compositions including dispersion aids, e.g. low-molecular organopolysiloxane having a degree of polymerization of 100 or smaller and silanol group- or alkoxy group-containing organosilane compounds, heat-resistance improvers, e.g. iron oxide, ceric oxide and iron octoate, coloring agents, e.g. pigments, and the like.

The silicone rubber composition of the invention prepared in the above described manner is suitable for hot-air vulcanization under normal pressure without the problems of internal void formation and appearance of surface tackiness in the cured silicone rubber body. Curing of the composition is complete usually by heating at 200° to 500° C. for 5 seconds to 10 minutes in a hot-air circulation oven or under an infrared radiation heater after shaping of the composition, for example, by extrusion molding or other known shaping method into a tube, sheet or insulation for electric wires. Steaming vulcanization, hot-liquid vulcanization and fluidized-bed vulcanization are also applicable. The cured rubber products produced from the inventive silicone rubber composition have excellent heat resistance and outstandingly small permanent compression set in addition to the above mentioned advantages of absence of surface tackiness and internal voids. Therefore, a variety of rubber articles can be manufactured from the inventive silicone rubber composition, including general-purpose heat-resistant rubber tubes, insulation for electric wires, automobile parts such as insulation for ignition cables, metal-sheath cables, plastic-sheath cables and rubber hoses, and the like.

The inventive silicone rubber composition is described in more detail by way of the following examples, in which the term "parts" always refers to "parts by weight" and the values of viscosity are all those obtained by the measurements at 25° C. Further, the vulcanization characteristics of the composition and internal microvoids and breakdown voltage of the cured rubber were examined each in the following manner:

Vulcanization characteristics of the composition were measured by using a disc rheometer (manufactured by Toyo Seiki Co.) at 120° C. at a deflection angle of ±3° for the determination of the torque in kgf.cm.

Internal microvoids in the cured rubber were microscopically observed in 100 magnification of a cross section if a cured silicone rubber string of 6 mm diameter by extruding the composition using a 40 mm diameter extruder machine followed by hot-air vulcanization in an oven at 380° C. with a holding time therein of 13 seconds.

Breakdown voltage of the cured rubber was measured according to the procedure for the withstand voltage specified in JIS C 3004 in water using 10 specimens of silicone rubber-insulated copper wires having an outer diameter of 1.2 mm and the diameter of the tin-plated core wire of 0.6 mm after hot-air vulcanization under normal pressure at 450° C. for 30 seconds.

Preparation 1

Bis(2-trimethylsilyl benzoyl) peroxide was synthesized in the following manner. A mixture composed of 158 ml (2 moles) of pyridine and 150 ml of diethyl ether was chilled at −10° C. and 62.5 ml (0.55 mole) of a 30% aqueous solution of hydrogen peroxide were added dropwise thereto. The temperature of the mixture slightly increased by evolution of heat so that the mixture was again chilled to keep the temperature at −10° C.

Thereafter, 1 mole of 2-trimethylsilyl benzoyl chloride was slowly added dropwise to the thus chilled mixture under vigorous agitation. The mixture was further agitated for additional 2 hours after completion of the dropwise addition of the 2-trimethylisilyl benzoyl chloride. The reaction mixture was neutralized by adding a cooled aqueous solution of sulfuric acid of 10% concentration and the reaction product was extracted from the mixture with a mixed solvent of ether and pentane. The extract was washed at 0° C. or below successively with a diluted sulfuric acid, aqueous solution of sodium carbonate and distilled water followed by dehydration with anhydrous sodium sulfate and removal of the solvent in a rotary evaporator. The thus obtained product was identified to be bis(2-trimethylsilyl benzoyl) peroxide. The product had a purity of at least 99% and the yield was about 80% of the theoretical value.

The same experimental procedure as above was repeated except that the 2-trimethylsilyl benzoyl chloride was replaced with the same amount of 4-trimethylsilyl benzoyl chloride. The product was bis(4-trimethylsilyl benzoyl) peroxide and the yield thereof was 85% of the theorethical value.

Preparation 2

Bis[2,4-di(trimethylsilyl)benzoyl]peroxide was synthesized in the following manner. An aqueous mixture prepared by mixing 126 g of a 25% aqueous solution of sodium hydroxide and 110 g of an aqueous solution containing 0.5 g of sodium dodecyl benzene sulfonate was chilled at 0° C. of 34 g of a 60% aqueous solution of hydrogen peroxide were added dropwise to the mixture kept at 0.5° C. or below. 284.5 g of 2,4-di(trimethylsilyl) benzoyl chloride were then slowly added dropwise over a period of 90 minutes to the aqueous mixture kept at a temperature of 0° to 5° C. under vigorous agitation followed by further continued agitation of the reaction mixture kept at the same temperature for additional 2 hours. The reaction mixture was filtered through a Buchner funnel and the precipitates on the filter paper were repeatedly washed with water until the washing was no longer alkaline followed by drying at room temperature under reduced pressure. The thus obtained product was identified to be the desired bis[2,4-di(trimthylsilyl) benzoyl] peroxide with a purity of about 98%.

Preparation 3

Bis(2-methyl-4-trimethylsilyl benzoyl) peroxide was synthesized in substantially the same manner as in the synthesis of bis(2-trimethylsilyl benzoyl) peroxide excepting replacement of the 2-trimethylsilyl benzoyl chloride with 2-methyl-4-trimethylsilyl benzoyl chloride. Bis(2-methyl-4-trimethylsilyl benzoyl) peroxide having a purity of at least 99% was obtained in a yield of about 80% of the theoretical value.

Preparation 4

Bis(2,6-dimethyl-4-trimethylsilyl benzoyl) peroxide was synthesized in substantially the same manner as in the synthesis of bis[2,4-di(trimethylsilyl) benzoyl] peroxide excepting replacement of the 2,4-di(trimethylsilyl) benzoyl chloride with 2,6-dimethyl-4-trimethylsilyl benzoyl chloride. The product thus obtained had a purity of about 98%.

EXAMPLE 1

An organopolysiloxane-based compound was prepared by uniformly blending 100 parts of a gum-like methyl vinyl polysiloxane composed of 99.8 mol% of dimethyl siloxane units of the formula $(CH_3)_2SiO$, 0.18 mol% of methyl vinyl siloxane units of the formula $(CH_2=CH)(CH_3)SiO$ and 0.02 mol% of vinyl dimethyl siloxane units of the formula $(CH_2=CH)(CH_3)SiO_{0.5}$ at the molecular chain terminals, 40 parts of a fumed silica filler (Aerosil 200, a product by Nippon Aerosil Co.) and 4 parts of diphenyl silane diol and the compound was plasticized by mastication in a two-roller mill after a heat treatment at 150° C. for 4 hours.

Separately, the bis(2-trimethylsilyl benzoyl) peroxide prepared in Preparation 1 was dispersed in a dimethyl silicone fluid having a viscosity of 1000 centistokes by milling in a three-roller mill into a paste-like form and 2 parts of the paste were added to 100 parts of the organopolysiloxane compound prepared in the above described manner and uniformly dispersed therein to give a curable silicone rubber composition.

The silicone rubber composition was shaped into a sheet of 2 mm thickness which was subjected to hot-air vulcanization under normal pressure for 3 minutes in a hot-air circulating oven at 250° C. followed by a post-curing treatment at 200° C. for 2 hours to give a cured silicone rubber sheet. This cured silicone rubber sheet was absolutely free from surface tackiness and internal voids and had the following mechanical properties: 52 hardness in the JIS scale; 320% ultimate elongation; 94 kgf/cm$^2$ tensile strength; and 15 kgf/cm tear strength.

EXAMPLE 2 AND COMPARATIVE EXAMPLE 1

An organopolysiloxane compound was prepared by compounding 100 parts of a methyl vinyl polysiloxane composed of 99.85% by moles of dimethyl siloxane units, 0.13 mol% of methyl vinyl siloxane units and 0.02 mol% of vinyl dimethyl siloxane units at the molecular chain terminals with 0.2 part of vinyl trimethoxy silane, 45 parts of the same fumed silica filler as used in Example 1, 2.5 parts of diphenyl silane diol and 7 parts of a low-viscosity silicone fluid having a degree of polymerization of 10 and terminated at each molecular chain end with a silanolic hydroxy group, uniformly in a two-roller mill followed by a heat treatment at 160° C. for 2 hours in a kneader and then straining through a strainer with a 150 mesh screen.

Separately, the bis[2,4-di(trimethylsilyl) benzoyl] peroxide prepared in Preparation 2 was dispersed in an equal amount of a dimethyl silicone fluid having a viscosity of 1000 centistiokes by milling in a three-roller mill into a paste-like form for use in Example 2. For comparative purpose, a similar paste was prepared of 2,4-dichlorobenzoyl peroxide in the same manner for use in Comparative Example 1.

The organopolysiloxane compound prepared in the above described manner was admixed with one of these peroxide pastes in an amount of 2.1 parts (Example 2) or 1.5 parts (Comparative Example 1) by uniformly milling in a two-roller mill to give a curable silicone rubber composition which was shaped into a sheet of 2 mm thickness. The sheet was subjected to hot-air vulcanization at 350° C. for 1 minutes under normal pressure followed by a post-cure treatment at 200° C. for 2 hours to give a cured silicone rubber sheet. The rubber sheets before the post-cure treatment were each free from surface tackiness and internal voids.

The cured silicone rubber sheets after the post-cure treatment were subjected to the measurements of the mechanical properties as well as the permanent compression set after 22 hours at 150° C. under 25% compression to give the results shown in Table 1. Further, the silicone rubber sheets were subjected to a steaming treatment for 24 hours in an atomosphere of steam at 175° C. Thereafter the mechanical properties were measured to give the results also shown in Table 1.

The results shown in Table 1 support the conclusion that the cured silicone rubber sheet obtained from the inventive silicone rubber composition is much superior to the rubber sheet prepared using conventional 2,4-dichlorobenzoyl peroxide as the curing agent with respect to the premanent compression set of the rubber sheet as cured and the stability of the mechanical properties after the steaming treatment.

EXAMPLES 3 AND 4 AND COMPARATIVE EXAMPLE 2

A base compound was prepared by uniformly blending 100 parts of a methyl vinyl polysiloxane having a viscosity of 10,000,000 centistokes and composed of 99.75 mol% of dimethyl siloxane units and 0.25 mol% of methyl vinyl siloxane units with a dimethyl vinyl silyl group at each molecular chain end, 40 parts of a fumed silica filler (Aerosil 200, supra) and 4 parts of diphenyl silane diol followed by a heat treatment at 150° C. for 4 hours and plasticization by mastication in a two-roller mill.

The base compound was further admixed with 0.5 part of a methyl hydrogen polysiloxane containing 1.6 moles of the hydrogen atoms directly bonded to the silicon atoms and terminated at each molecular chain end with a trimethyl silyl group and 1.5 parts of a pasty vulcanizing agent containing 50% by weight of bis(4-trimethylsilyl benzoyl) peroxide prepared in Preparation 1 by kneading in a two-roller mill to give a curable silicone rubber composition in Example 3.

TABLE 1

| | | Example 2 | Comparative Example 1 |
|---|---|---|---|
| As post-cured | Hardness, JIS | 52 | 54 |
| | Ultimate elongation, % | 360 | 330 |
| | Tensile strength, kgf/cm$^2$ | 100 | 110 |
| | Tear strength, | 17 | 15 |

TABLE 1-continued

| | | Example 2 | Comparative Example 1 |
|---|---|---|---|
| | kgf/cm$^2$ | | |
| | Permanent compression set, % | 30 | 54 |
| After steaming | Hardness, JIS | 48 | 44 |
| | Ultimate elongation, % | 335 | 410 |
| | Tensile strength, kgf/cm$^2$ | 65 | 38 |

A silicone rubber-insulated electric wire was prepared by providing a tin-plated annealed copper wire of 3 mm diameter with an insulating layer of the above prepared silicone rubber composition with a thickness of 1 mm by use of a 40 mm diameter extruder machine followed by hot-air vulcanization in a hot-air oven at 400° C. for 15 seconds (Example 3). The thus cured silicone rubber layer without a post-cure treatment was free from surface tackiness and had a hardness of 61 in the JIS scale. The hardness was decreased to 57 after 3 days of heating at 200° C. in a glass ampule.

For comparison with the silicone rubber of Example 4, the same test as above was repeated except the methyl hydrogen polysiloxane was omitted. The cured silicone rubber layer had surface tackiness and had a hardness, JIS, of 60 as cured and 56 after thermal aging at 200° C. for 3 days in a glass ampule.

For further comparison in Comparative Example 2, the same test as in Example 3 was repeated except the methyl hydrogen polysiloxane was omitted and the bis(4-trimethylsilyl dibenzoyl) peroxide was replaced by the same amount of 2,4-dichlorobenzoyl peroxide. The cured silicone rubber layer in this case was free from surface tackiness and had a hardness, JIS, of 60 as cured and 43 after thermal aging at 200° C. for 3 days in a glass ampule.

EXAMPLES 5 TO 7

Three silicone rubber compositions were prepared each with the same formulation as in Example 3 except that the methyl hydrogen polysiloxane had a viscosity of 18 centistokes and was composed of 50% by moles of methyl siloxane units of the formula (CH$_3$)HSiO, 45 mol% of dimethyl siloxane units and 5 mol% of trimethyl siloxane units of the formula (CH$_3$)$_3$SiO$_{0.5}$ in an amount of 1.0 part, 0.03 part or 15.0 parts in Examples 5 to 7, respectively. The rubber compositions of Examples 5 and 7 cured in the same manner as in Example 3 had no surface tackiness while the cured rubber composition of Example 6 had surface tackiness. The cured rubber compositions of Examples 5 to 7 had insulation resistance of 3500, 3460 and 1250M ohm, respectively, as measured according to the procedure specified in JIS C 3004-1975.

EXAMPLES 8 TO 11

A base compound was prepared by uniformly blending 100 parts of a gum-like methyl vinyl polysiloxane having an average degree of polymerization of about 6000 and composed of 99.8 mol% of dimethyl siloxane units and 0.2 mol% of methyl vinyl siloxane units with a dimethyl vinyl silyl group at each molecular chain end, 40 parts of a fumed silica filler (Aerosil 200, supra), 10 parts of a dimethyl polysiloxane fluid having an average degree of polymerization of 8 and terminated at each molecular chain end with a silanolic hydroxy group and 0.3 part of vinyl trimethoxy silane followed by a heat treatment at 150° C. for 4 hours.

In each of Examples 8 and 9, the thus prepared base compound was further admixed with 0.3 or 2.0 parts, respectively, of a methyl hydrogen polysiloxane expressed by the formula.

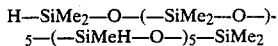

in which Me is a methyl group, and 2.5 parts of a pasty vulcanizing agent of silicone fluid containing 50% by weight of bis(2-trimethylsilyl benzoyl) peroxide to give a curable silicone rubber composition. In Examples 10 and 11, the base compound was admixed with the same amount of the peroxide paste together with or without, respectively, 1.0 part of a paste containing 50% by weight of calcium hydroxide and lacking the methyl hydrogen polysiloxane.

Each of the thus prepared four silicone rubber compositions was shaped into a continuous-length tube having an inner diameter of 5 mm and outer diameter of 9 mm by extrusion molding and, by being subjected to hot-air vulcanization under normal pressure at 300° C. for 60 seconds followed by a post-cure treatment at 180° C. for 4 hours, converted into a cured silicone rubber tube. The silicone rubber tubes obtained in Examples 8 and 9 were free from surface tackiness and had good transparency and tensile strength of 94 kgf/cm² and 90 kgf/cm², respectively. The silicone rubber tube obtained in Example 10 was almost free from surface tackiness but had poor transparency and tensile strength of 88 kgf/cm². The silicone rubber tube obtained in Example 11 was somewhat tacky on the surface but had good transparency and tensile strength of 92 kgf/cm².

EXAMPLE 12

A base compound was prepared by uniformly blending 100 parts of a methyl vinyl polysiloxane composed of 99.8 mol% of dimethyl siloxane units, 0.175% by moles of methyl vinyl siloxane units and 0.025% by moles of dimethyl vinyl siloxane units at the molecular chain terminals, 40 parts of a fumed silica filler (Aerosil 200, supra) and 4 parts of diphenyl silane diol followed by a heat treatment at 150° C. for 4 hours and plasticization by mastication in a two-roller mill.

Thereafter, 100 parts of the thus prepared base compound were admixed with 2 parts of a paste of bis(2-methyl-4-trimethylsilyl benzoyl) peroxide, the product in Preparation 3. The mixture was dispersed in a dimethyl silicone fluid having a viscosity of 1000 centistokes by milling in a three-roller mill to give a curable silicone rubber composition which was shaped into a sheet of 2 mm thickness followed by a hot-air vulcanization and post-cure treatment in the same manner as in Example 1. The thus cured silicone rubber sheet was absolutely free from surface tackiness and internal voids and had mechanical properties including: 50 hardness according to the JIS scale; 36% ultimate elongation; 90 kgf/cm² tensile strength; and 15 kgf/cm tear strength.

EXAMPLE 13

The experimental procedure was substantially the same as in Example 2 excepting replacement of the bis[2,4-di(trimethylsilyl) benzoyl] peroxide with the same amount of the bis[2,6-dimethyl-4-trimethylsilyl benzoyl] peroxide prepared in Preparation 4. The results of the experiments were that the vulcanizate had no surface tackiness and internal voids and the mechanical properties of the cured silicone rubber as cured included: 54 of hardness in the JIS scale; 320% of ultimate elongation; 115 kgf/cm² of tensile strength, 14 kgf/cm of tear strength; and 27% of permanent compression set after 22 hours at 150° C. under a compression of 25%. The cured silicone rubber after 24 hours of steaming at 175° C. had mechanical properties including: 50 hardness in the JIS scale, 350% ultimate elongation; and 87 kgf/cm² tensile strength.

These results support the conclusion that the cured silicone rubber sheet obtained by use of 2,6-dimethyl-4-trimethylsilyl benzoyl peroxide as the curing agent is much superior to the rubber sheet obtained using conventional 2,4-dichlorobenzoyl peroxide as the curing agent with respect to permanent compression set of the rubber sheet as cured and the stability of the mechanical properties against the steaming treatment.

What is claimed is:

1. A vulcanizable silicone rubber composition which comprises:
   (A) 100 parts by weight of an organopolysiloxane represented by the average unit formula

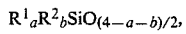

in which $R^1$ is a monovalent hydrocarbon group free from aliphatic unsaturation, $R^2$ is an alkenyl group, the subscript a is a positive number in the range from 1.8 to 2.2 and the subscript b is zero or a positive number not exceeding 0.1 with the proviso that a+b is in the range from 1.8 to 2.2; and
   (B) from 0.1 to 5 parts by weight of an organic peroxide represented by the general formula

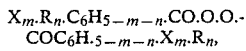

in which R is a monovalent group selected from the group consisting of methyl, ethyl, methoxy and ethoxy groups, X is a silyl group of the formula —$SiR^3_3$ or a silyl-substituted methyl group of the formula —$CH_2SiR^3_3$, $R^3$ being a hydrogen atom, a methyl group or an alkoxy group, the subscript m is 1 or 2 and the subscript n is zero, 1, or 2.

2. The silicone rubber composition as claimed in claim 1 wherein the organopolysiloxane as the component (A) is a diorganopolysiloxane having a linear molecular structure and each of the terminal silicon atoms has two or three vinyl groups bonded thereto.

3. The silicone rubber composition as claimed in claim 1 wherein the silyl group of the formula —$SiR^3_3$ is a trimethyl silyl group.

4. The silicone rubber composition as claimed in claim 3 wherein the silyl group of the formula —$SiR^3_3$ is bonded to the benzene nucleus at the 2- or 4-position of the nucleus relative to the carbonyl.

5. The silicone rubber composition as claimed in claim 1 wherein component (B) is selected from the group consisting of bis-(2-trimethylsilyl benzoyl) peroxide, bis-(4-trimethylsilyl benzoyl) peroxide and bis[2,4-di(trimethylsilyl) benzoyl] peroxide.

6. The silicone rubber composition as claimed in claim 1 wherein component (B) is bis-(2-methyl-4-trimethylsilyl benzoyl) peroxide or bis(2,6-dimethyl-4-trimethylsilyl benzoyl) peroxide.

7. The silicone rubber composition as claimed in claim 1 which further comprises at least 0.05 parts by weight of an organosilicon compound having, in a molecule, at least one hydrogen atom directly bonded to the silicon atom.

8. The silicone rubber composition as claimed in claim 7 which contains from 0.05 to 10 parts by weight of the organosilicon compound.

9. A vulcanized rubber produced by the hot air vulcanization of a silicone rubber composition of claim 1.

10. The vulcanized rubber of claim 9 wherein the starting organo-polysiloxane is a diorganopolysiloxane as the component (A) having a linear molecular structure and each of the terminal silicon atoms has two or three vinyl groups bonded thereto and the silyl group of the starting organic peroxide is trimethylsilyl.

11. The vulcanized rubber of claim 9 wherein component (B) is selected from the group consisting of bis-(2-trimethylsilyl benzoyl) peroxide, bis-(4-trimethylsilyl benzoyl) peroxide and bis-[2,4-di(trimethylsilyl) benzoyl] peroxide.

12. The vulcanized rubber of claim 9 wherein component (B) is bis(2-methyl-4-trimethylsilyl benzoyl) peroxide or bis(2,6-dimethyl-4-trimethylsilylbenzoyl) peroxide.

13. A vulcanized rubber of claim 9, further comprising from 5 to 100 parts by weight of a reinforcing filler wherein the filler is fumed silica.

14. A method of hot air vulcanizing a vulcanizable organopolysiloxane which comprises hot air vulcanizing the vulcanizable silicon rubber composition according to claim 1.

15. The method of claim 14, wherein the starting organo-polysiloxane is a diorganopolysiloxane as the component (A) having a linear molecular structure and each of the terminal silicon atoms has two or three vinyl groups bonded thereto and the silyl group of the starting organic peroxide is trimethylsilyl.

16. The method of claim 14, wherein component (B) is selected from the group consisting of bis-(2-trimethylsilyl benzoyl) peroxide, bis-(4-trimethylsilyl benzoyl) peroxide and bis-[2,4-di(trimethylsilyl) benzoyl] peroxide.

17. The method of claim 14, wherein component (B) is bis(2-methyl-4-trimethylsilyl benzoyl) peroxide or bis(2,6-dimethyl-4-trimethylsilylbenzoyl) peroxide.

18. The method of claim 14, the admixture further comprises from 0.05 to 10 parts by weight of an organosilicon compound having, in a molecule, at least one hydrogen atom directly bonded to the silicon atom.

19. A method of claim 14, the admixture further comprising 5–100 parts by weight of fumed silica.

* * * * *